M. SCOTT.
Weighing Attachments for Hay-Forks.

No. 155,391.            Patented Sept. 29, 1874.

UNITED STATES PATENT OFFICE.

MONTEZUMA SCOTT, OF HOMEWOOD, PENNSYLVANIA.

IMPROVEMENT IN WEIGHING ATTACHMENTS TO HAY-FORKS.

Specification forming part of Letters Patent No. 155,391, dated September 29, 1874; application filed August 8, 1874.

*To all whom it may concern:*

Be it known that I, M. SCOTT, of Homewood, in the county of Beaver and State of Pennsylvania, have invented a certain new and useful Weighing Attachment to Hay-Forks, &c.; and I do hereby declare the following to be a full, clear, and exact description of the invention, such as will enable others skilled in the art to which it pertains to make and use it, reference being had to the accompanying drawings, which form part of this specification, in which—

Figure 1:
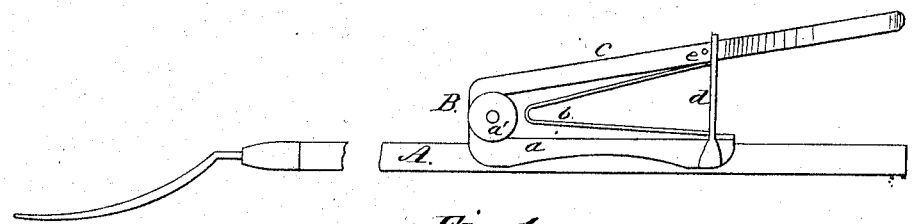
Figure 2:
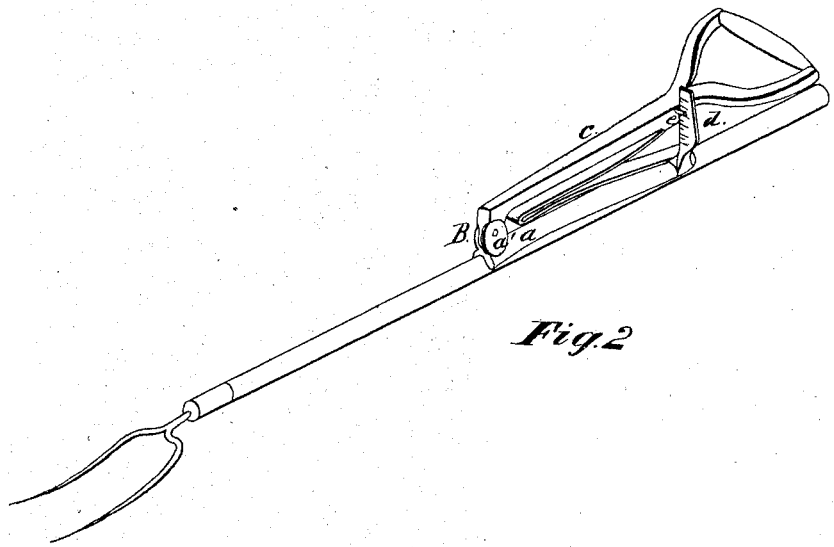

Figure 1 is a side view, and Fig. 2 a perspective view, of my invention.

This invention has relation to the combination, with a pitch-fork, of a weighing attachment, comprising a pivoted handle, scale-beam, pointer, and spring, all as hereinafter described.

Referring to the accompanying drawing, A designates the fork-handle, and B the weighing attachment. The latter comprises a concave base-plate, $a$, fitting closely, and secured to the upper side of the handle A, a spring, $b$, pivoted handle $c$, and graduated scale $d$. The plate $a$ has ears $a'$ at its forward end, to which the handle $c$ is pivoted, and at its rear end holds the graduated scale-standard $d$. The spring is located between the plate $a$ and handle $c$, as shown. From the side of the latter a pointer or index, $e$, projects in front of the scale.

In using the weighing device, the load is first taken upon the fork, after which the handle of the latter is released, and the handle $c$ taken hold of, so as to suspend the fork, which then serves as a scale-lever, the weighted end descending and the handle turning on the pivot at $a'$, thereby compressing the spring and raising the scale-standard, so that the proper numeral indication of the weight of the load will be made to coincide with the pointer or index.

This weighing device is obviously applicable to shovels and other similar implements, as well as to pitch-forks, and may be made detachable, so as to be applicable to the different kinds of implements, according to requirements.

What I claim as my invention, and desire to secure by Letters Patent, is—

The weighing attachment consisting of the base-plate $a$, scale-standard $d$, pivoted handle $c$, and spring $b$, combined substantially as described and shown.

In testimony that I claim the foregoing I have hereunto set my hand this 24th day of July, 1874.

MONTEZUMA SCOTT.

Witnesses:
WARWICK SCOTT,
J. P. MCCREADY.